(12) United States Patent
Pan

(10) Patent No.: US 9,229,123 B2
(45) Date of Patent: Jan. 5, 2016

(54) METHOD FOR HANDLING ROUGH SEA AND IRREGULAR RECORDING CONDITIONS IN MULTI-SENSOR TOWED STREAMER DATA

(75) Inventor: Naide Pan, Sugar Land, TX (US)

(73) Assignee: PGS GEOPHYSICAL AS, Oslo (NO)

( * ) Notice: Subject to any disclaimer, the term of this patent is extended or adjusted under 35 U.S.C. 154(b) by 944 days.

(21) Appl. No.: 13/190,049

(22) Filed: Jul. 25, 2011

(65) Prior Publication Data

US 2013/0028049 A1  Jan. 31, 2013

(51) Int. Cl.
*G01V 1/38* (2006.01)
*G01V 1/36* (2006.01)

(52) U.S. Cl.
CPC ... *G01V 1/36* (2013.01); *G01V 1/38* (2013.01); *G01V 2210/532* (2013.01); *G01V 2210/56* (2013.01)

(58) Field of Classification Search
CPC ..... G01V 1/36; G01V 1/38; G01V 2210/532; G01V 2210/56
USPC .......................................................... 367/24
See application file for complete search history.

(56) References Cited

PUBLICATIONS

Amundsen, L., 1993, "Wave-number-based filtering of marine point soure data", Geophysics, vol. 58, No. 9, p. 1335-1348.
Amundsen, L. et al., 2005, "Rough-sea deghosting of streamer seismic data using pressure gradient approximations", Geophysics, vol. 70, No. 1, p. V1-V9.
Carlson, D. et al., 2007, "Increased resolution and penetration from a towed dual-sensor streamer", First Break, vol. 25, p. 71-77.
Orji, O.C. et al., 2009, "Imaging the sea surface using a dual-sensor towed streamer", SEG Ann. Mtg., Exp. Abstr., p. 2079-2883.
Robertsson, J.O.A. et al., 2002, "Rough sea deghosting using a single streamer and a pressure gradient approximation", Geophysics, vol. 73, No. 6, p. 2005-2011.
Sollner, W. et al., 2008, "Space-frequency domain processing of irregular dual-sensor towed streamer data", SEG Ann. Mtg., Exp. Abstr., p. 1078-1082.
Tenghamn, R. etal., 2007, A dual-sensor, towed marine streamer: Its viable implimation and initial results, SEG Ann. Mtg., Exp. Abstr., p. 989-993.

*Primary Examiner* — Daniel L Murphy

(57) ABSTRACT

Rough sea elevation is estimated from a high-frequency portion of recorded pressure data and recorded vertical velocity component data. Generalized deghosting and datuming operators are constructed, which take into account the estimated rough sea elevation and irregular recording depth conditions. A low-frequency portion of the recorded pressure data is decomposed into up-going and down-going wavefields on a horizontal reference plane, using the generalized datuming and deghosting operators. A low-frequency portion of the vertical velocity component data is reconstructed from the decomposed up-going and down-going wavefields on the horizontal reference plane, using the generalized datuming and deghosting operators.

24 Claims, 7 Drawing Sheets

US 9,229,123 B2

METHOD FOR HANDLING ROUGH SEA AND IRREGULAR RECORDING CONDITIONS IN MULTI-SENSOR TOWED STREAMER DATA

BACKGROUND

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle motion sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times (the activation commonly known as a "shot"). Seismic streamers, also called seismic cables, are elongate cable-like structures towed in the body of water by the seismic survey vessel that tows the seismic source or by another seismic survey ship. Typically, a plurality of seismic streamers is towed behind a seismic vessel. The seismic streamers contain sensors to detect the reflected wavefields initiated by the seismic source and returning from reflective interfaces. The pressure sensors and particle motion sensors may be deployed in close proximity, collocated in pairs or pairs of arrays along a seismic cable. An alternative to having the geophone and hydrophone collocated, is to have sufficient spatial density of sensors so that the respective wavefields recorded by the hydrophone and geophone can be interpolated or extrapolated to produce the two wavefield signals at the same location.

Dual sensor recordings aim to decompose the recorded seismic data into upgoing and downgoing wavefield components. After decomposition, the obtained upgoing wavefields represents a wavefield that no longer contains downward propagating wavefields. In other words, the upgoing wavefields no longer contain interfering reflection events that first have been reflected at the water surface, propagating downwards before being recorded by the seismic receivers, such as hydrophones and geophones. Because these interfering downgoing wavefields, known as "receiver ghosts", have been removed, the bandwidth of the recorded signal has increased, which aids in the interpretation of the recorded data at later stages. Additionally, a deeper tow is allowed, which increases the weather operation window, since the effects of wave action due to bad weather is decreased at a deeper depth.

The low-frequency range of the vertical velocity component (typically from a vertical geophone) cannot be accurately measured in current dual-sensor towed streamer practice due to excessive noise.

BRIEF DESCRIPTION OF THE DRAWINGS

Various embodiments and their advantages may be more easily understood by reference to the following detailed description and the attached drawings, in which.

DETAILED DESCRIPTION

The low-frequency range of the vertical velocity component typically has a low end of 0-3 Hz and a high end of 15-20

Hz. Therefore, this low-frequency portion of the vertical velocity component has to be reconstructed in some manner. Solving this reconstruction problem is important for the use of dual-sensor towed streamer technology. Conventionally, the low-frequency elements of vertical velocity are still calculated by using pressure data, even though the data are physically recorded by a dual-sensor towed streamer. A conventional method is to apply the relation between pressure and the normal component of particle velocity in acoustic theory, and combine it with a well-known deghosting filter, which normally assumes that the air-water free surface is flat. Although it is a good approximation for many practical cases, a rough sea with elevation variations and its effect should not be ignored.

Rough sea estimation and deghosting has been the subject of interest for the seismic industry. Recently, some techniques using single-sensor streamer pressure and pressure gradient approximation have been developed. These methods either make a common assumption that rough sea wave heights are known, which is not the case in current marine seismic practice, or have limitations on the accuracy of vertical velocity (or pressure gradient) estimates, which is caused by a series expansion truncation. Moreover, rough sea deghosting becomes more difficult to accomplish if the seismic data is recorded on an irregular recording surface using a single-sensor towed streamer.

Thus, a need exists for a method for reconstructing the low-frequency vertical velocity component of dual-sensor towed streamer seismic data, taking both rough sea elevation and irregular recording surface into account. Additionally, the method should allow the efficient generation of operators for datuming, deghosting and sea level estimation under the same rough sea elevation and irregular recording surface conditions. Preferably, the method is data-driven, using all the reliable measured dual-sensor data, except for the low frequency vertical velocity component data, which is reconstructed.

Figure 1:
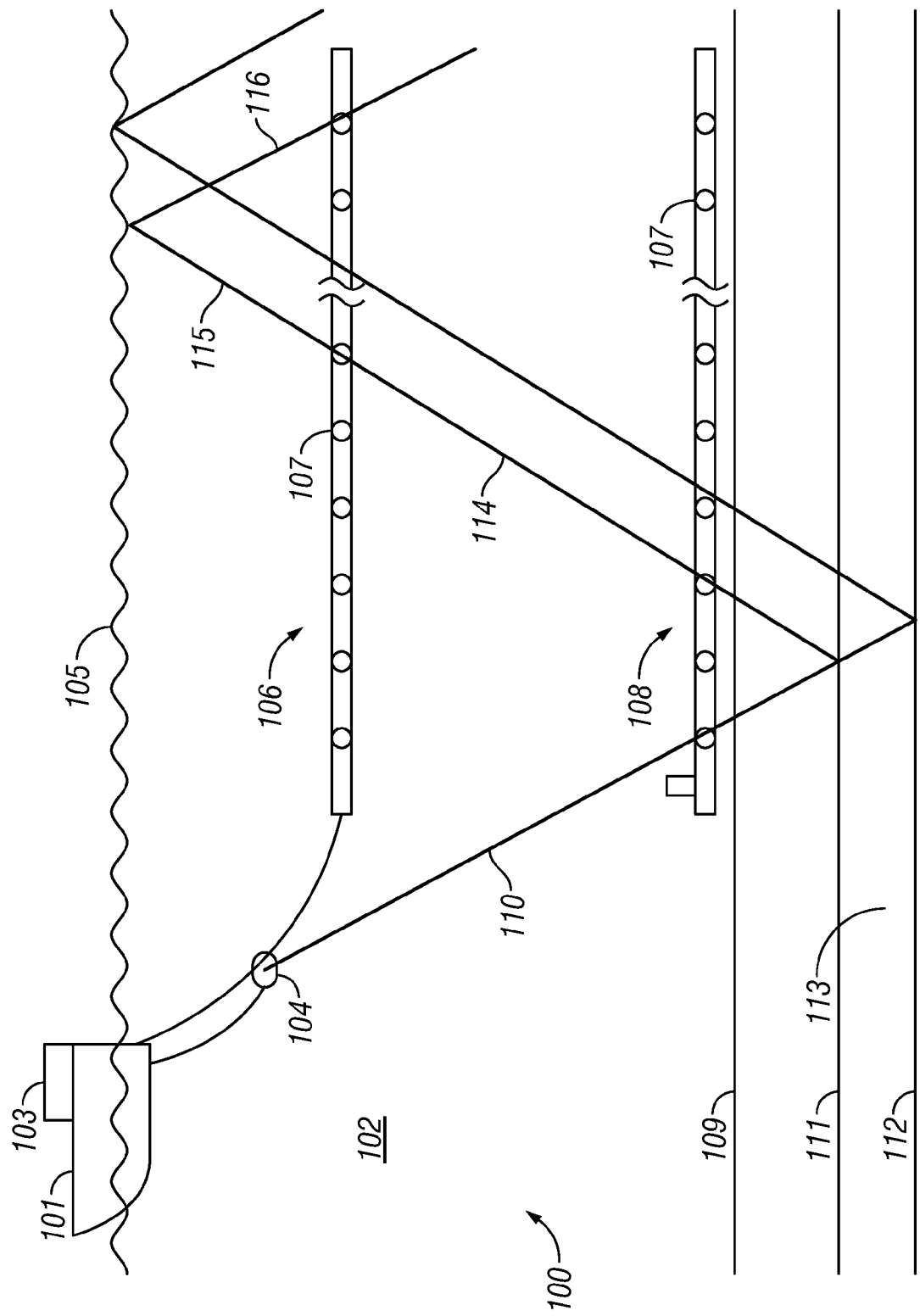
FIG. 1 is a diagram of an example system for acquiring seismic data suitable for use in accordance with embodiments of the invention.

FIG. 1 is a diagram of an example system for acquiring seismic data suitable for use in accordance with embodiments of the invention. In various embodiments, a single seismic sensor cable (also called a seismic streamer) or a single ocean bottom cable are shown for simplicity of illustration. This illustration of one cable is only meant to more clearly demonstrate principles of the invention and is not intended as a limitation of the invention.

In FIG. 1, the seismic acquisition system is designated generally as 100. A seismic vessel 101 is disposed in a body of water 102 and carries equipment 103 for navigation, seismic source control, and seismic sensor recording. The seismic vessel 101 or another service vessel (not shown) tows a seismic source 104 through the body of water 102 below the surface 105 of the water. The seismic source 104 comprises any appropriate type of source, typically in arrays. The configuration of seismic sources 104 used is not intended to be a limitation of the invention.

In one embodiment, the seismic vessel 101 or another service vessel (not shown) tows a seismic streamer 106 through the body of water 102. The seismic streamer 106 comprises seismic sensors 107 at spaced apart positions along the seismic streamer 106, so that the seismic sensors 107 are disposed in the body of water 102. The seismic sensors 107 are typically pressure sensors, such as hydrophones. In another embodiment, the seismic streamer 106 comprises a dual-sensor streamer, in which the seismic sensors 107 comprise pairs of collocated pressure and particle motion sensors. The particle motion sensors are typically particle velocity sensors, such as geophones, or accelerometers. The seismic sensors 107 typically comprise arrays of sensors at each spaced apart position. An alternative to having the pressure and particle motion sensors co-located is to have sufficient spatial density of sensors so that the respective wavefields recorded by the pressure and particle motion sensors can be interpolated or extrapolated to produce the two wavefield signals at the same location.

In another embodiment, the seismic vessel 101 or another service vessel (not shown) disposes an ocean bottom cable 108 on the water bottom 109. The ocean bottom cable 108 also comprises seismic sensors 107 at spaced apart positions along the cable, also typically in arrays of sensors at each spaced apart position. The seismic sensors 107 in the ocean bottom sensor 108 can also comprise pairs of pressure and particle motion sensors. In yet another embodiment, both seismic streamers 106 and ocean bottom cable 108 are employed. The type of sensors illustrated in the seismic acquisition system 100 is not intended to be a limitation of the invention. For example, in other embodiments, discrete seismic sensors 107 located at ocean bottom nodes (not shown) could be included in the seismic acquisition system 100.

When the seismic source 104 is activated, acoustic energy travels downwardly, at 110, through the body of water 102 and the water bottom 109 to layer boundaries, such as 111 and 112, surrounding a subterranean formation layer, such as 113. A portion of the acoustic energy is reflected from the layer boundary at 111 and travels upwardly, at 114. The upwardly traveling acoustic energy 114 is detected at seismic sensors 107 on the ocean bottom cable 108 or the seismic streamer 106. The upwardly traveling acoustic energy continues upward, at 115, until reflecting off the water surface 105 and then travels downwardly again, at 116. The downwardly traveling acoustic energy 116 may be detected again by seismic sensors 107 on the seismic streamer 106 or the ocean bottom cable 108, resulting in a ghost signal. The acoustic energy detected at the seismic sensors 107 may be recorded onto any type of appropriate storage media at any location, such as, but not restricted to, at the seismic streamer 106 or the ocean bottom cable 108, on the seismic vessel 101 or another service vessel, or onshore.

Being able to datum recorded marine seismic data, especially dual-sensor data, from an irregular recording surface to a horizontal plane is very useful in seismic data processing. Various embodiments in accordance with the invention can datum either single pressure data or dual-sensor data measured on an irregular recording surface to any horizontal plane between the free surface boundary and the recording surface in an efficient way. When only pressure data are available, the free surface boundary condition (flat horizontal plane) is explicitly needed and used in the derivation of datuming operators. If dual-sensor data are used, then no assumption of a flat sea surface is required.

One embodiment is a wave theory based method for reconstructing the low-frequency portion of the vertical velocity component from recorded pressure data under both rough sea and irregular recording conditions by using dual-sensor towed streamer seismic data. In a general embodiment, the method comprises two steps. The first step is to estimate the rough sea elevation using the dual-sensor towed streamer data. This data comprises recorded pressure data and recorded vertical velocity component data, both at a high-frequency bandwidth (typically, about 15-20 Hz and above). The second step is to apply a generalized deghosting and datuming operator, which takes into account both rough sea elevation and irregular recording depth variations, on the recorded low-frequency pressure data (typically, about 0-3 Hz to about 15-20 Hz). The original recorded pressure data are now more accurately decomposed into up-going and down-going wavefields at a horizontal reference plane, and then the low-frequency vertical velocity component is reconstructed at the horizontal reference plane from the decomposed up-going and down-going pressure wavefields.

The wavefield extrapolation operators involved in the two steps are closely connected by the Green's functions corresponding to forward and inverse wavefield extrapolations in a water column and the boundary condition at the air-water free surface. Due to the space-variant characteristics of rough sea and irregular recording surfaces, the space-variant operators, in either a frequency-space or a time-space domain, have advantages in numerical implementation and efficiency. An efficient method to generate the new deghosting and datuming operators from well-known constant velocity "plane-to-plane" extrapolation operators is developed. Embodiments in accordance with the invention solve two relevant problems involved in dual-sensor towed streamer use. These two problems are estimating rough sea elevation variation and reconstructing low-frequency vertical velocity component data from pressure data for the most common marine seismic practice where both sea and recording surfaces are not flat.

An embodiment is also extended to an efficient method for datuming and decomposing either pressure or dual-sensor data measured on an irregular recording surface to a horizontal reference plane between the recording and free sea surfaces. If only the pressure data are used, then, in principle, datuming and decomposing invokes both vanishing pressure boundary (Dirichlet) condition at the air-water free surface and a flat sea assumption. If dual-sensor data, both pressure and vertical component of particle velocity data, is used, then the method requires neither the Dirichlet condition nor the flat sea assumption.

Some embodiments may be based on the following assumptions. The pressure and vertical velocity component data are acquired by a dual-sensor towed streamer on an irregular recording surface. For high-frequency bandwidth (about 15-20 Hz to the highest recorded frequency), the data are preconditioned, that is, decomposed to up-going and down-going pressures and vertical velocity components, and datumed to a horizontal reference line (two-dimensional or 2D) or plane (three-dimensional or 3D) at depth $z=Z_0$.

For low-frequency (about 0-3 Hz to about 15-20 Hz) bandwidth, only pressure data are reliably acquired on the irregular recording surface and used. The acoustic medium properties, both density and velocity, of water column are assumed to be constant. The rough sea elevation variations are unknown values, while the irregular recording surface depth variations are known values. For simplicity, all formulas in this application are expressed in 2D form, with horizontal coordinate x and depth z, although the formulas can be extended straightforwardly to 3D. For generality, operator symbols are used and designated in bold.

The acoustic wavefield at any point in a water column of a half space below the air-water free surface can be calculated by a wave theory Kirchhoff integral, using measured pressure (for single-sensor towed streamer) or both pressure and its normal derivative (for dual-sensor towed streamer), and a specifically defined Green's function (G). For a volume bounded by the air-water free surface and the recording surface, the Kirchhoff integral is often further simplified by choosing a suitable reflecting boundary condition for the Green's function at the above two boundary surfaces. In many seismic data processing applications, a much simpler version of the Kirchhoff integral is obtained and applied by introducing the Dirichlet condition (G=0) at both the free and recording surfaces and combining it with vanishing pressure boundary condition at the free surface. The input for the integral is the measured pressure data only, without need of its normal derivative (or normal velocity component).

Historically, marine seismic has been dominated by single-sensor towed streamer, which records pressure only, so that the above simplified Kirchhoff integral has been one of the most commonly used versions in practice. However, imposing the Dirichlet condition or approximating the pressure normal derivative on the recording surface will often introduce errors, instability, and artifacts into the related wavefield calculations and applications. When both pressure and normal velocity component are measured by a dual-sensor towed streamer, such simplification and approximations are no longer needed. Therefore, the Dirichlet condition is only imposed on the free surface, but not on the recording surface.

Based on Green's theorem, the Kirchhoff integral used here should include both pressure and normal velocity component which are physically measured, and both Green's function and its normal derivative for a constant velocity water column. However, if the pressure (or normal velocity) is decomposed into its up-going and down-going waves at a horizontal reference plane within the water column, then the Kirchhoff integral can be expressed equivalently by up-going and down-going pressure (or normal velocity) waves and the corresponding Green's functions. Importantly, in such transformed formulations, the related Green's functions will be well-known one-way constant-velocity wavefield extrapolation operators, respectively. In the following, operator notations R and R* will be used to express up-going and down-going upward wavefield extrapolation, respectively. Conventional notation U and D will be used to denote up-going and down-going pressure waves, respectively.

Under the above theoretical conditions, the up-going and down-going pressure at any horizontal observation plane $(z=Z_s)$, designated as $U_s(x)$ and $D_s(x)$, respectively, can be expressed from their counterpart up-going and down-going pressure at the horizontal reference plane $(z=Z_o, Z_o>Z_s)$, designated as $U_o(x)$ and $D_o(x)$, respectively, by upward wavefield extrapolation:

$$U_s(x)=RU_o(x)$$

and $$D_s(x)=R^*D_o(x), \quad (1)$$

where R, R* are the Green's function operators described above. R* is normally a conjugate of R when both reference and observation planes are horizontal. For notational simplicity, and the advantage of expressing the general solution without reference to any specific technique, generic operator symbols are employed throughout this application. These techniques can include, but are not limited to, Fourier transform, ray-tracing, and finite differences. Therefore, for numerical implementation, R can represent either multiplication operations (in, for example, a frequency-wavenumber domain) or convolution operations (in, for example, frequency-space or time-space domains), depending upon features of the problem. For the constant-velocity water medium and the plane-to-plane problem, R and R* are simple and regular in the sense that all elements of the operators are connected by the same depth parameter:

$$\Delta z=Z_s-Z_o$$

for all domain expressions.

A rough sea height estimate can be determined by making upward wavefield extrapolation for a series of different z values within a sea height variation range using Equation (1), and applying the boundary condition of pressure vanishing at air-water free surface:

$$Uz'(x')+Dz'(x')=0$$

or $$Uz'(x')=-Dz'(z'), \quad (2)$$

where z' is the z value which satisfies Equation (2) for a given x' value. From all the determined (x', z') pairs, a sea surface elevation estimate z(x) can be obtained.

In one embodiment, the following norm of U and D is used at each given x' value for all tested z values to determine z(x) numerically:

$$X = \Sigma(|U_z(x')| - |D_z(x')|)^2 \text{ for all tested z values,} \quad (3)$$

where the summation is for circular frequency or time. The minimum of norm X yields the closest sea level estimate z'(x'). In other embodiments, alternative norms could be used instead of that in Equation (3).

In the above derivation, the sea surface is implicitly assumed to be static within a seismic recording time range (typically about 6-10 sec). However, in practice the sea level varies with time and may be approximately stable for no more than 2 seconds. So, a more effective approach will be to calculate the sea level heights for different time windows in the recording time range, and get dynamic sea elevation estimates. Then, the time-variant sea height estimates need to be applied to corresponding time windows in the following calculations. Since an extension from static to time-variant for this matter is straightforward, for simplicity, the static sea surface is only dealt with here.

This problem can be better solved by using dual sensor measurements than single sensor measurements. For the dual sensor data, the problem can be solved by either a migration process or a forward modeling approach. The forward modeling approach has an advantage of generating the generalized deghosting operator for a rough sea condition more efficiently. In principle, the numerical calculations involved in both migration and forward modeling techniques can be efficiently accomplished in either time-space or frequency-wavenumber domains, or even a hybrid of the two, as far as a constant-velocity medium is concerned. However, because of the space-variant characteristic of rough sea and, more importantly, to derive a deghost operator easily from R and R* that can take rough sea elevations into account, operators expressed in the frequency-space domain are more suitable for this method.

During the above process of determining z(x), new operators R' and R'*, which take the rough sea elevation variation into account, can be directly generated from the basic operators R and R*, which are accurate for the flat sea surface. If R and R* are expressed in frequency-space domain by matrices, this generation is straightforward. The elements at each row of these R and R* matrixes are the same, but are shifted between rows, and all rows are connected by a unique extrapolation depth increment $\Delta z$. However, for a curved sea surface, each row of the new matrices R' and R'* now corresponds to a different z(x) value. Hence, different rows are in general related to different z values. The new operators R' and R'* are no longer connected by the unique $\Delta z$ value, but by many different $\Delta z$ values determined by the sea level function z(x). To generate and express such new operators (multiple $\Delta z$ values) by the original operators (single $\Delta z$ value), a sorting operator is introduced:

$$R' = S(R)$$

and $$R'^* = S(R^*), \quad (4)$$

where S represents a sorting process to establish the new operators R' and R'* from the old operators R and R*, for all rows based on a related sea level estimate:

$$\Delta z(x) = z(x) - z_o.$$

This space parameter (x for 2D and x, y for 3D) related indexing and sorting process can be efficiently implemented in the frequency-space domain. To make this process more efficient, all R and R* operators corresponding to pre-defined $\Delta z$ values (within a sea elevation variation range) are calculated only once for the whole survey in advance. These R and R* operator values can then be saved in a common database for later retrieval. This use of a common database significantly reduces the redundant calculations involved in both the determination of z(x) and the generation of the operators R' and R'*, as described above.

Now, the new operators are applied to related wavefield extrapolations. Equation (1) can be rewritten as follows:

$$U_z(x) = R' U_o(x)$$

and $$D_z(x) = R'^* D_o(x), \quad (5)$$

where the subscript z of U and D is now a sea level function z(x), which is not constant. In contrast to the plane-to-plane operators R and R*, the operators R' and R'* are more accurate for "plane-to-curved surface" wavefield extrapolation, where the curved surface is the rough sea surface.

Note that although $U_o(x)$ and $D_o(x)$ are still used to express the up-going and down-going wavefields at the horizontal reference plane ($z = Z_o$), in the following equations they will represent low frequency bandwidth components only. Now, if the Dirichlet boundary condition at the air-water free surface is applied to Equation (5), then an equivalent of Equation (2) can be obtained as follows:

$$R' U_o(x) + R'^* D_o(x) = 0 \quad (6)$$

Equation (6) is rewritten as:

$$R'^* P_o(x) = (R'^* - R') U_o(x), \quad (7)$$

where $$P_o(x) = U_o(x) + D_o(x) \quad (8)$$

represents a total pressure at the horizontal reference plane. From Equation (7), the upgoing pressure $U_0(x)$ at the horizontal reference plane can be further expressed as follows:

$$U_o(x) = (R'^* - R')^{-1} R'^* P_o(x), \quad (9)$$

where both R' and R'* are known operators and the notation $(\bullet)^{-1}$ is introduced to denote a general inversion operation, including, but not limited to, inverse filtering, de-convolution, and matrix inverse. As can be seen from Equation (9), a convolution and de-convolution type of operator $(R'^* - R')^{-1} R'^*$ is required to calculate $U_o(x)$ from $P_o(x)$. If z(x) is constant, then the operator on the right-hand side of Equation (9) is reduced to:

$$R^*/R^* - R = 1/1 - R^2,$$

which is a conventional deghost operator for flat seas. However, the operator $(R'^* - R')^{-1} R'^*$ in Equation (9) is a more generalized deghost filter, accurate for rough sea state conditions as well.

Similar to the derivation of Equations (7) and (9), the following can be obtained:

$$R' P_o(x) = (R' - R'^*) D_o(x). \quad (10)$$

Then, the down-going wavefield at the horizontal reference plane can be expressed by:

$$D_o(x) = (R' - R'^*)^{-1} R' P_o(x) \quad (11)$$

As can be seen from Equation (11), a similar convolution and de-convolution operation is involved in the calculation of $D_o(x)$ from $P_o(x)$. The operator $(R'-R'^*)^{-1}R'$ in Equation (11) is also a generalized deghost filter, satisfying the rough sea condition.

Alternatively, either the down-going $D_o(x)$ or up-going $U_o(x)$ wave at the horizontal reference plane can be obtained more easily from Equation (8), once the other, either $U_o(x)$ or $D_o(x)$, respectively, has been obtained from Equations (9) or (11), respectively.

When the recording surface is irregular, no low frequency total pressure $P_o(x)$ is directly measured or accurately calculated at the horizontal reference plane. Therefore, Equations (7) to (11) are suitable and useful for flat recording surfaces only. To derive the corresponding separation or datuming formulas suitable for the irregular recording surface, two new operators $R''$ and $R''^*$ are introduced which can accurately downward extrapolate $U_o$ and $D_o$ from the horizontal reference plane to a known irregular recording surface $z(x)$. As described above, once the rough sea elevation variations are known, then the new operators $R'$ and $R'^*$ can be generated from the operators $R$ and $R^*$ easily and efficiently through a sorting process. Similarly, the new operators $R''$ and $R''^*$ can be easily generated by a sorting process from $R$ and $R^*$ too, except that $R$ and $R^*$ are now related to downward extrapolations. Note that the recording surface depths $z(x)$ are normally a known function in marine seismic practice. Thus, in contrast to forming the operators $R'$ and $R'^*$ under the rough sea condition, generating the operators $R''$ and $R''^*$ for irregular recording surface is more straightforward.

To generate the new operators $R''$ and $R''^*$ efficiently, all $R$ and $R^*$ operators corresponding to different $\Delta z$ values (within a typical streamer depth variation range now) are calculated only once in advance for the whole survey and stored in a common database. Again, in this way the repeated calculations involved in generation of $R''$ and $R''^*$ can be significantly reduced for each individual seismic measurement (shot).

Now the total pressure $P_r(x)$, measured on the irregular recording surface, can be expressed by downward extrapolation of $U_o(x)$ and $D_O(x)$, using the new operators $R''$ and $R''^*$, as follows:

$$P_r(x)=R''U_o(x)+R''^*D_o(x), \quad (12)$$

and hence $$U_o(x)=(R'')^{-1}[P_r(x)-R''^*D_o(x)], \quad (13)$$

where $R''$ and $R''^*$ are plane-to-curved-surface downward extrapolation operators, for up-going and down-going waves, respectively.

Substituting the relation between $U_o(x)$ and $D_o(x)$ expressed in Equation (6) into Equation (13), and performing some algebraic manipulations on the operators, yields:

$$U_o(x)=[I-(R'')^{-1}R''^*(R'^*)^{-1}R'](R'')^{-1}P_r(x), \quad (14)$$

where I is unit operator. If the operator $R_u$ is defined by $$R_u[I-(R'')^{-1}R''^*(R'^*)^{-1}R']^{-1}(R'')^{-1},$$

then Equation (14) can be rewritten in simpler form as:

$$U_o(x)=R_uP_r(x). \quad (15)$$

The operator $R_u$ is a generalized deghost and datum operator, accurate for wave field separation under the general condition that both sea and recording surfaces are not necessarily flat. If the total pressure $P_r$ is directly measured or accurately calculated at the horizontal reference plane (that is, without datum operators involved), then $R_u$ is equivalent to the deghost operator given by equation (9). Similarly to the derivation of Equation (15), the formula for $D_o(x)$ can be obtained as follows:

$$D_o(x)=R_dP_r(x). \quad (16)$$

where $$R_d=[I-(R''^*)^{-1}R''(R')^{-1}R'^*]^{-1}(R''^*)^{-1}$$

is also a generalized deghost and datum operator.

The low frequency vertical velocity component can easily be reconstructed at the horizontal reference plane $(z=Z_O)$ from $U_o(x)$ and $D_o(x)$, either obtained from Equations (9) and (11), respectively, for the simpler case of a flat recording surface and a rough sea or obtained from Equations (15) and (16), respectively, for the more complicated case of an irregular recording surface and a rough sea. This can be done, for example, by using the following classic formulas between pressure and normal velocity component:

$$V_n(x) = \frac{-U_o(x)}{F} \quad (17)$$

$$V_d(x) = \frac{D_o(x)}{F},$$

and $$V_o(x) = V_d(x) + V_n(x) = \frac{D_o(x)-U_o(x)}{F}, \quad (18)$$

where $V_u(x)$ and $V_d(x)$ are up-going and down-going waves, respectively, of the low-frequency vertical velocity component at the horizontal reference plane, and $V_o(x)$ is the total low-frequency vertical velocity component. The obliquity factor F for a constant velocity water column is defined as:

$$F = \frac{\rho\omega}{k_z}$$

in the frequency-wavenumber domain, where $\rho$ is water density, $\omega$ is circular frequency, and $k_z$ is vertical wave number. Note that the obliquity factor F is normally expressed in the frequency-wavenumber domain. When the space domain notations of $U_o$, $D_o$, $V_u$, $V_d$ and $V_o$ remain in Equations (17) and (18) above, F should be considered as its equivalent in the space domain. The factor F can be transformed from the frequency-wavenumber domain to the space domain by, for example, a Fourier transform. The reconstructed low-frequency components are integrated with the high-frequency components of vertical velocity data, in conventional fashion.

The above method can be extended to a datuming method which can efficiently datum and decompose either pressure data or dual sensor data recorded at an irregular surface to up-going and down-going components at a horizontal reference plane. The following describes the case for single-sensor pressure data.

Adding Equations (15) and (16) yields the total pressure:

$$P_o(x)=(R_d+R_u)P_r(x)=R_pP_r(x) \quad (19)$$

where, recall, $P_o(x)=U_o(x)+D_o(x)$ is the total pressure at the horizontal reference plane and $P_r(x)$ is the total pressure measured at the irregular recording surface. The one-way up-going and down-going operators $R_u$ and $R_d$ are described above. $R_p=R_u+R_d$ is the two way operator which datums $P_r(x)$ to $P_O(x)$ and takes both rough sea and irregular recording surface conditions into account. Similarly, Equation (18) yields the total vertical velocity component:

$$V_o(x) = \frac{(R_d - R_u)P_r(x)}{F} = \frac{R_v P_r(x)}{F}, \quad (20)$$

where $R_v = R_d - R_u$ is the two way operator similar to $R_p$, taking care of both rough sea elevation and irregular surface depth variation, but datuming $P_r(x)$ to $V_o(x)$.

From Equations (19) and (20) the generalized relation between total vertical velocity component $V_o(x)$ and total pressure $P_o(x)$ at the horizontal reference plane can be further obtained as follows:

$$V_o(x) = \frac{[R_v(R_p)^{-1}]P_o(x)}{F}, \quad (21)$$

where the new generalized deghost operator $R_v (R_p)^{-1}$ addresses both rough sea and irregular recording effects. This deghost operator is reduced to:

$$-\frac{1+R^2}{1-R^2},$$

the conventional deghost operator, for flat sea and recording surfaces. Note again, for simplicity, that the space notation is kept for $V_o$ and $P_o$ in Equations (20) and (21), even though the factor F is normally expressed in frequency-wavenumber domain. The needed operators $R_p$, $R_v$, (or $R_u$, $R_d$) can be generated by plane-to-plane operators as described above.

It might appear that, by using Equations (19) to (20), both pressure and vertical velocity component at the horizontal plane can be calculated from pressure data which is measured on irregular surface, without the need for vertical velocity component data. However, it is worth noting in the derivation of these equations that the vanishing pressure boundary condition at air-water free surface is explicitly invoked and applied. If both pressure and the vertical velocity component data are measured and applied, as described next, this boundary condition is not required for derivation of needed equations. The following describes the case for dual-sensor pressure data and vertical velocity component.

In parallel with Equation (12) for $P_r(x)$, the corresponding equation for $V_r(x)$ can be written as follows:

$$-QU_o(x) + Q^*D_o(x) = i\rho\omega V_r(x) = P_z(x), \quad (22)$$

where $V_r(x)$ is the vertical velocity component measured at the irregular recording surface, $P_z(x)$ is a normal derivative of pressure relating to $V_r(x)$ by the factor $i\rho\omega$, i is the imaginary number, and new downward extrapolation operators Q and $Q^*$ are defined by:

$$Q = ik_z R''$$

and $$Q^* = ik_z R''^*$$

Solving for $U_o(x)$ and $D_o(x)$ from Equations (12) and (22) yields:

$$U_0(x) = \frac{Q^* P_r - R''^* P_z}{2iK_z R'' R''^*} \quad (23)$$

and $$D_0(x) = \frac{Q P_r + R'' P_z}{2iK_z R'' R''^*}. \quad (24)$$

Using the relations for Q and $Q^*$ defined above, Equations (23) and (24) can be simplified as $$U_o(x) = \frac{1}{2}[(R'')^{-1}P_r(x) - (Q)^{-1}P_z(x)] \quad (25)$$

and $$D_o(x) = \frac{1}{2}[(R''^*)^{-1}P_r(x) - (Q^*)^{-1}P_z(x)] \quad (26)$$

From Equations (25) and (26), total pressure $P_o(x)$ and total vertical velocity component $V_o(x)$ can be expressed as:

$$P_o(x) = \frac{1}{2}\{[(R''^*)^{-1} + (R'')^{-1}]P_r(x) + [(Q^*)^{-1} - (Q)^{-1}]P_z(x)\} \quad (27)$$

and $$V_o(x) = \frac{1}{2}\frac{[(R''^*)^{-1} - (R'')^{-1}]P_r(x) + [(Q^*)^{-1} + (Q)^{-1}]P_z(x)}{F}, \quad (28)$$

where, if factor F is expressed in frequency-wavenumber domain, then $V_o(x)$, $P_r(x)$ and $P_z(x)$ should be changed to their counterparts in the frequency-wavenumber domain accordingly, by, for example, Fourier transforms.

Equations (25) to (28) provide a generalized formulation for accurately datuming both the pressure and the vertical velocity component from an irregular recording surface to any horizontal reference plane between the recording surface and the free surface, without requiring a flat sea assumption. When the recording surface is horizontal, with $R''=R$, $R''^*=R^*$, $Q=ik_z R$, and $Q^*=ik_z R^*$, Equations (25) to (28) are equivalent to the classical plane-to-plane acoustic propagation equations.

There are total of six operators: R, $R^*$; R', $R'^*$; and R'', $R''^*$, in three pairs, involved in the generalized deghosting and datuming calculations. As described, R, and $R^*$ are the simple constant velocity one-way wave propagators, R' and $R'^*$ take rough sea effects into account, while R'' and $R''^*$ take irregular recording surfaces into account. Both R', $R'^*$ and R'', $R''^*$ can be more efficiently generated from known propagators R, $R^*$ by an indexing and sorting process. However, R', $R'^*$ require the additional step of determining an unknown function z(x) of rough sea heights, while R'', $R''^*$ are established more easily from a known irregular recording surface.

In marine seismic, the physical data acquisition is shot-based, so the operators R', $R'^*$ and R'', $R''^*$ vary shot by shot. For a marine seismic survey, millions of shots are typically involved. If these operators are calculated independently for each shot, then the method will be very inefficient. However, considering the mathematical characteristics involved, all four operators R', $R'^*$; and R'', $R''^*$, can be sorted from the two operators R and $R^*$, then a very efficient and robust algorithm can be developed. First, for a given survey, maximum variation ranges in depth are defined for both the rough sea height and the irregular recording surface. Secondly, based on this and the survey geometry parameters, upward and downward propagators R, $R^*$ are calculated for all defined depth values and a common database is created to include all element of these generic operators in advance. Finally, the needed operators R', $R'^*$; and R'', $R''^*$ are generated for each particular shot experiment via a sorting process based on the common database. Thus, it is not necessary to calculate the elements of the deghosting and datuming operators individually. In this fashion, a significant amount of redundant calculations can be reduced.

Figure 2:
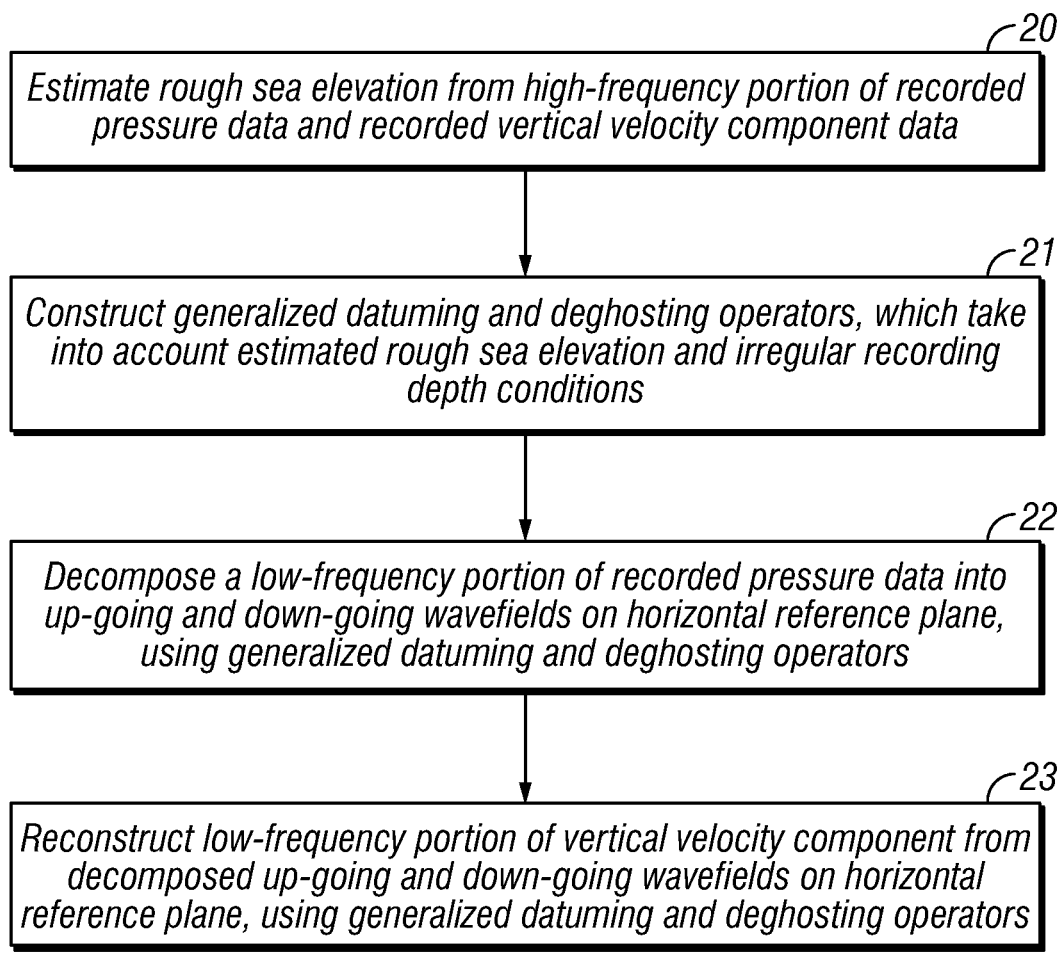
FIG. 2 is a flowchart illustrating an example embodiment of a method for reconstructing low-frequency vertical velocity component data under rough sea and irregular recording depth conditions.

Example embodiments are described below with regard to the flowcharts in FIGS. 2 to 6. FIG. 2 is a flowchart illustrating an example embodiment of a method for reconstructing low-frequency vertical velocity component data under rough sea and irregular recording depth conditions. In one embodiment, a programmable computer is used to perform the following.

At block 20, rough sea elevation is estimated from a high-frequency portion of recorded pressure data and recorded vertical velocity component data.

At block 21, generalized datuming and deghosting operators are constructed, which take into account the estimated rough sea elevation from block 20 and irregular recording depth conditions.

At block 22, a low-frequency portion of the recorded pressure data are decomposed into up-going and down-going wavefields on a horizontal reference plane, using the generalized datuming and deghosting operators from block 21.

At block 23, a low-frequency portion of the vertical velocity component data is reconstructed from the decomposed up-going and down-going wavefields from block 22 on the horizontal reference plane, using the generalized datuming and deghosting operators from block 21.

In the following FIGS. 3 to 6, example embodiments are illustrated with dual-sensor streamer data. This embodiment will be used for illustrative purposes here, but is not intended to restrict the source of the data. The embodiments may be applied to any type of multi-sensor data from any type of acquisition system, such as, for example, towed streamers, ocean bottom cable, or nodes. The multi-sensor data can include three- and four-component sensors, but comprises at least pressure and vertical velocity component data or their equivalents.

Figure 3:
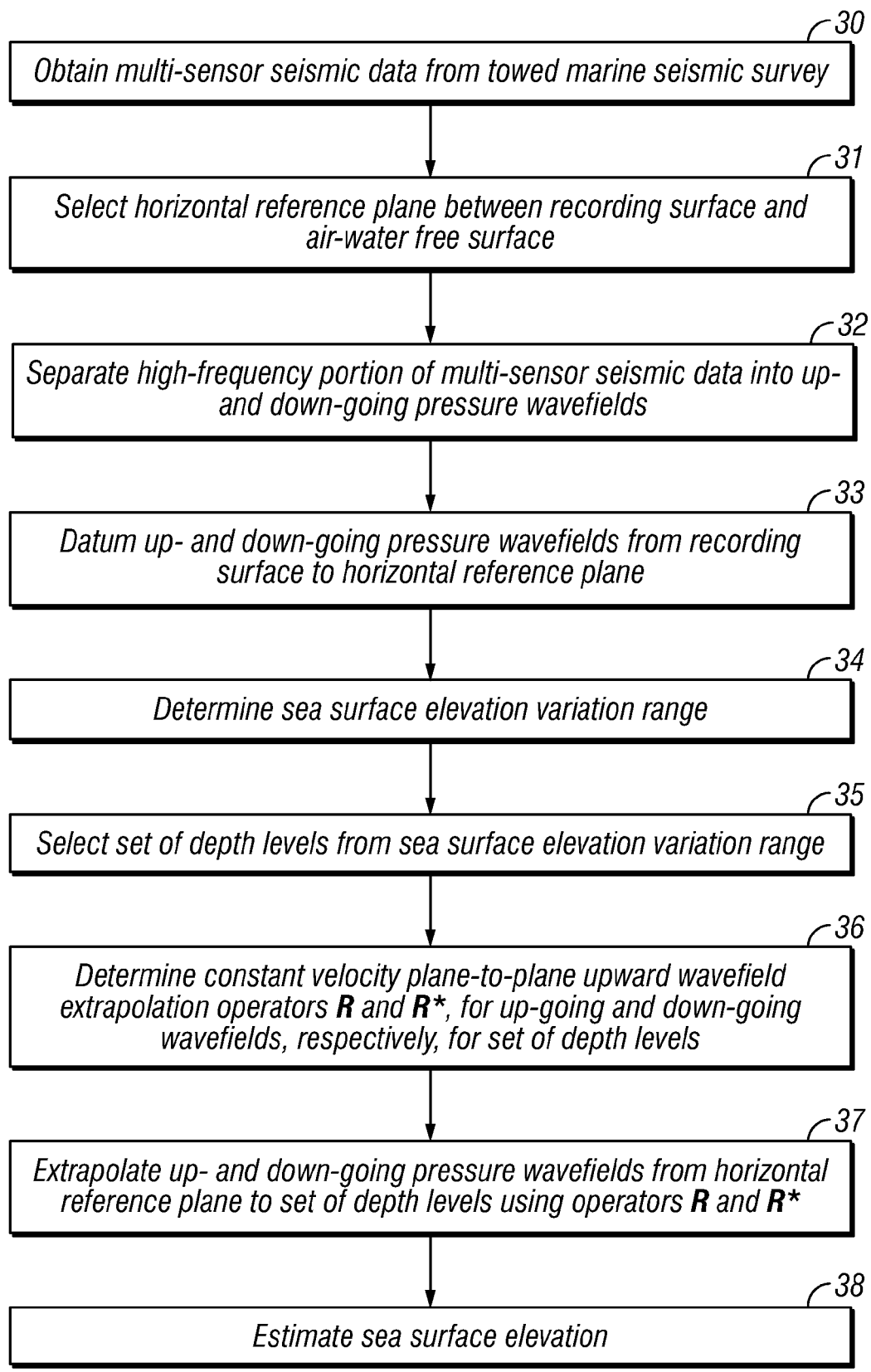
FIG. 3 is a flowchart illustrating an example embodiment of a method for estimating rough sea elevations under rough sea and irregular recording depth conditions.

FIG. 3 is a flowchart illustrating an example embodiment of a method for estimating rough sea elevations under rough sea and irregular recording depth conditions.

At block 30, dual-sensor seismic data are obtained from collocated pressure and vertical velocity component sensors in a marine seismic survey. Obtaining the dual-sensor seismic data can include acquiring data, such as by a marine seismic survey, or retrieving previously acquired data from storage, such as from computer memory or other types of memory storage devices or media.

At block 31, a horizontal reference plane is selected between a recording surface and an air-water free surface. The recording surface, comprising seismic receivers towed in marine seismic streamers, can be irregular. However, the recording surface is considered to be known, since measurement of the positions of the seismic sensors in the towed streamers is standard practice in marine seismic surveying. The air-water free surface, comprising the sea surface, can also be irregular, especially under rough sea conditions. However, measurement of the positions of the rough sea elevation is not standard practice in marine seismic surveying. Thus, the rough sea elevation will be estimated below.

At block 32, a high-frequency portion of the pressure data from the dual-sensor data from block 30 is separated into up-going and downgoing pressure wavefields. The high-frequency portion of the dual-sensor data comprises a frequency range from a lower end at about 15-20 Hz to a higher end at the upper end of the recorded seismic spectrum, typically one hundred to several hundred Hz.

At block 33, the up-going and downgoing pressure wavefields from block 32 are datumed from the recording surface to the horizontal reference plane from block 31.

At block 34, a sea surface elevation variation range is determined. The range is determined to cover the variation in sea surface elevation expected in the marine seismic survey.

At block 35, a set of depth levels is selected from the sea surface elevation variation range from block 34. The set of depth levels is selected to cover the variation range expected in the marine seismic survey.

At block 36, constant velocity plane-to-plane upward extrapolation operators R and R*, for up-going and down-going wavefields, respectively, are determined for the set of depth levels selected in block 35. For efficiency, a common database of the operators R and R* for the entire marine seismic survey is constructed and saved.

At block 37, the up-going and down-going pressure wavefields from block 33 are extrapolated from the flat reference plane from block 31 to the set of depth levels from block 35 using the operators R and R* from block 36. In one embodiment, the up-going and down-going pressure wavefields are extrapolated using Equation (1).

At block 38, a sea surface elevation is estimated. The sea surface elevation is estimated as a function $z(x)$, determined by minimizing the norm between up-going and down-going pressure wavefields for all x values. Since pressure values only are being used, the boundary condition of vanishing pressure at the air-water free surface must be applied. In one embodiment, the sea surface elevation is estimated using Equations (2) and (3).

Figure 4:
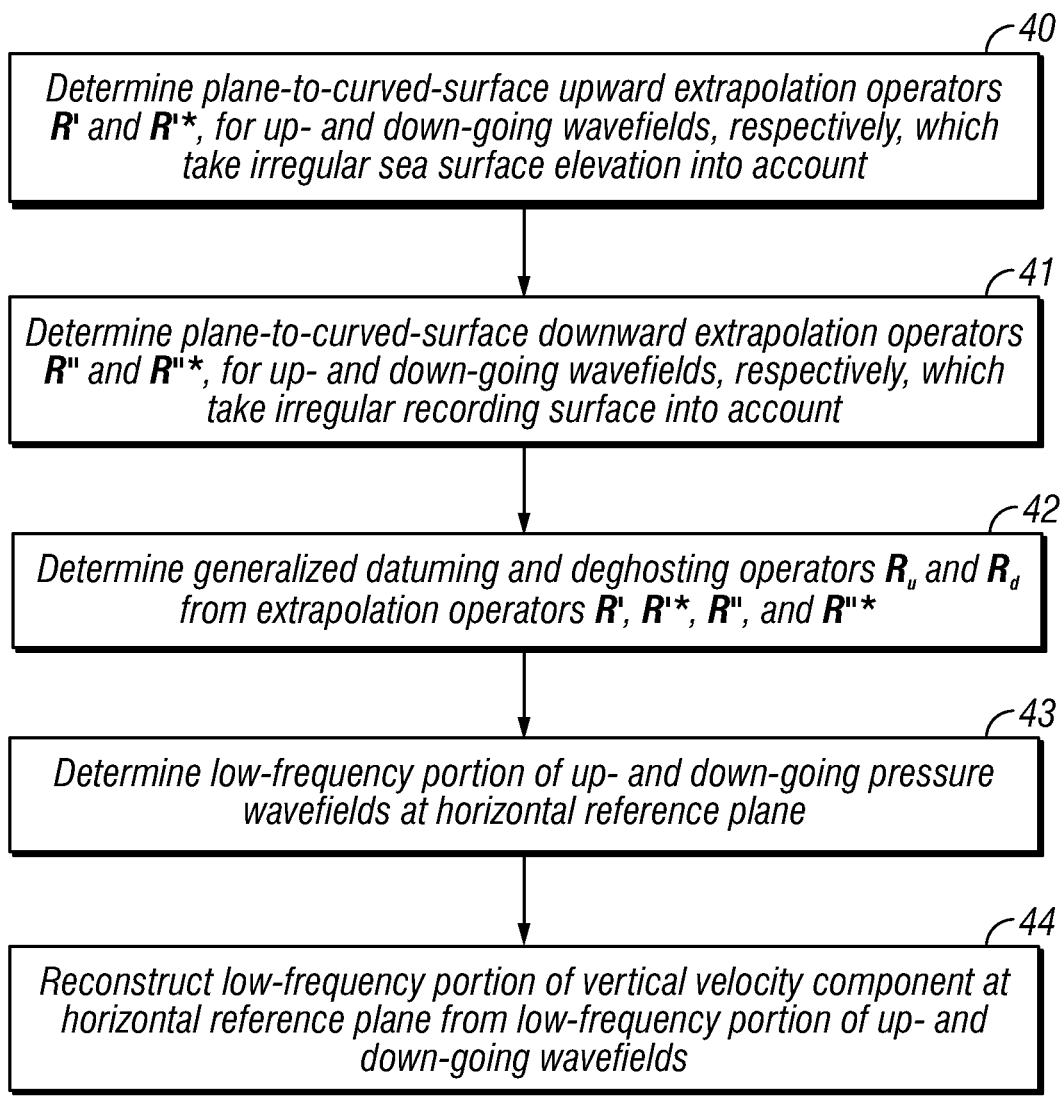
FIG. 4 is a flowchart illustrating an example embodiment of a method for reconstructing low-frequency vertical velocity component data under rough sea and irregular recording depth conditions.

FIG. 4 is a flowchart illustrating another example embodiment of a method for reconstructing low-frequency vertical velocity component data under rough sea and irregular recording depth conditions.

At block 40, plane-to-curved-surface upward extrapolation operators R' and R'*, for up-going and down-going wavefields, respectively, are determined which take an irregular sea surface elevation $z(x)$ into account. In one embodiment, for efficiency, the extrapolation operators R' and R'* are determined from the common database of extrapolation operators R and R*, respectively, from block 36 of FIG. 3. In this embodiment, the extrapolation operators R' and R'* are determined via a sorting process, as discussed with regard to Equation (4), above.

At block 41, plane-to-curved-surface downward extrapolation operators R" and R"*, for up-going and down-going wavefields, respectively, are determined which take an irregular recording surface into account. In one embodiment, the extrapolation operators R" and R"* are determined from the common database of extrapolation operators R and R*, respectively, from block 36 of FIG. 3. In this embodiment, the extrapolation operators R" and R"* are determined via a sorting process, the same as discussed with regard to Equation (4), above, except that the depth level changes are now associated with the known irregular recording surface.

At block 42, generalized deghosting and datuming operators $R_u$ and $R_d$ are determined from the extrapolation operators R' and R'* from block 30 and R" and R"* from block 41.

At block 43, a low-frequency portion of up-going and down-going pressure wavefields are determined at the horizontal reference plane from block 31 of FIG. 3. In one embodiment, the low-frequency portion of up-going and down-going pressure wavefields are determined from the deghosting and datuming operators $R_u$ and $R_d$ from block 42. In this embodiment, the up-going and down-going pressure wavefields are determined using Equations (15) and (16), above.

At block 44, a low-frequency portion of the vertical velocity component at the horizontal reference plane is reconstructed from the low-frequency portion of the up-going and down-going pressure wavefields determined at the horizontal reference plane in block 43, taking an irregular sea surface and an irregular recording surface into account. The low-frequency portion of the dual-sensor data comprises a frequency range from about 0-3 Hz at a lower end to about 15-20 Hz at a high end. In one embodiment, the low frequency portion of the vertical velocity component is reconstructed using Equations (17) and (18), above.

Figure 5:
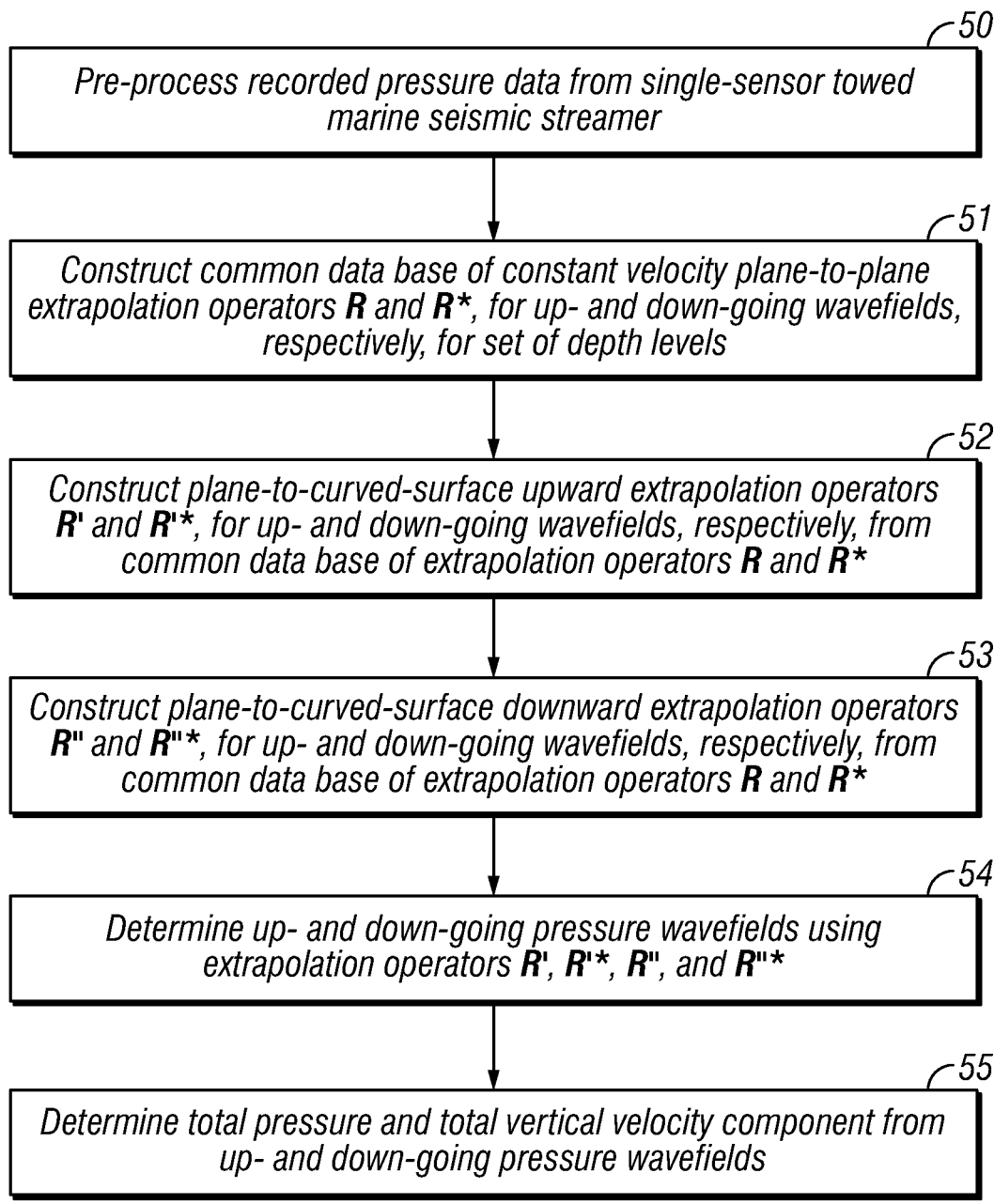
FIG. 5 is a flowchart illustrating an example embodiment of a method for datuming single sensor pressure data under rough sea and irregular recording depth conditions.

FIG. 5 is a flowchart illustrating another example embodiment of a method for datuming single sensor pressure data under irregular recording depth conditions.

At block 50, recorded pressure data from a single-sensor towed marine seismic streamer are pre-processed.

At block 51, a common database of constant velocity plane-to-plane extrapolation operators R and R*, for up-going and down-going wavefields, respectively, is determined for the set of depth levels from block 35 of FIG. 3.

At block 52, plane-to-curved-surface upward extrapolation operators R' and R'*, for up-going and down-going wavefields, respectively, are constructed from the common database of extrapolation operators R and R* from block 51. An estimate of sea surface elevation is required, such as by measurement or any calculation available with single-sensor streamer data. If an estimate of sea surface elevation is not available, then a flat sea surface may be assumed, and extrapolation operators R' and R'* are not needed; extrapolation operators R and R* can be used instead.

At block 53, plane-to-curved-surface downward extrapolation operators R" and R"*, for up-going and down-going wavefields, respectively, are constructed from the common database of extrapolation operators R and R* from block 51.

At block 54, up-going and down-going pressure wavefields are determined using the extrapolation operators R' and R'* from block 52 and the extrapolation operators R" and R"* from block 53. In one embodiment, the up-going and down-going pressure wavefields are determined using Equations (15) and (16).

At block 55, total pressure and total vertical velocity component are determined from the up-going and down-going pressure wavefields from block 54. In one embodiment, the total pressure and total vertical velocity component are determined using Equations (19) and (20).

Figure 6:
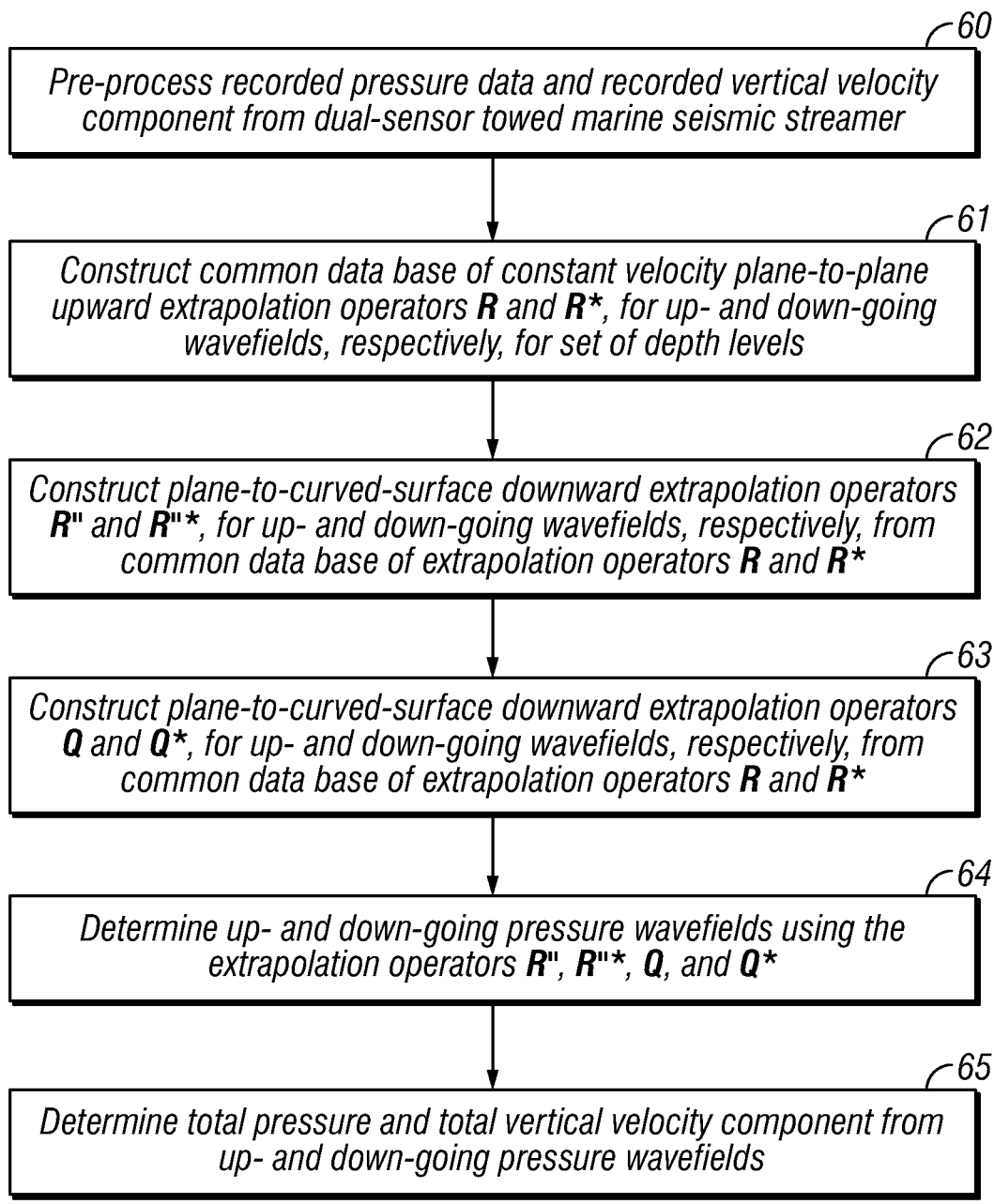
FIG. 6 is a flowchart illustrating another example embodiment of a method for datuming dual sensor pressure and vertical velocity component data under rough sea and irregular recording depth conditions.

FIG. 6 is a flowchart illustrating another example embodiment of a method for datuming dual sensor pressure and vertical velocity component data under rough sea and irregular recording depth conditions.

At block 60, recorded pressure data and recorded vertical velocity component data from a dual-sensor towed marine seismic streamer are pre-processed.

At block 61, a common database of constant velocity plane-to-plane upward extrapolation operators R and R*, for up-going and down-going wavefields, respectively, is constructed from the recorded pressure data from block 60.

At block 62, plane-to-curved-surface downward extrapolation operators R" and R"*, for up-going and down-going wavefields, respectively, are constructed from the common database of extrapolation operators R and R* from block 61.

At block 63, plane-to-curved-surface downward extrapolation operators Q and Q*, for up-going and down-going wavefields, respectively, are constructed from the common database of extrapolation operators R and R* from block 61.

At block 64, up-going and down-going pressure wavefields are determined using the extrapolation operators R" and R"* from block 62 and the extrapolation operators Q and Q* from block 63. In one embodiment, the up-going and down-going pressure wavefields are determined using Equations (25) and (26).

At block 65, total pressure and total vertical velocity component are determined from the up-going and down-going pressure wavefields from block 64. In one embodiment, the total pressure and total vertical velocity component are determined using Equations (27) and (28).

The example embodiments illustrated here resolve two problems involved in dual sensor towed streamer technology and application. These problems are to estimate rough sea elevation and to reconstruct low-frequency vertical velocity component from pressure for rough sea state and irregular recording surface.

Thus, the embodiments provide generalized deghost and datuming operators, which take into account both rough sea and irregular recording surface effects and therefore are accurate for reconstruction of low frequency vertical velocity component from pressure under the more common practice. The new operators are still expressed in frequency-space (or wavenumber) domains, similar to the simplest plane-to-plane operators, although elements of the operators are no longer single z value dependent, but depth (of both sea and recording surfaces) dependent.

To efficiently generate the new operators, an efficient method is developed. All elements of the new operators can be easily sorted (but not calculated) from the well-known constant velocity plane-to-plane extrapolation operators. A common database for the whole seismic survey to include all elements needed for generating new operators is calculated only one time in advance. Use of this common database significantly reduces redundant calculations and cost.

Further embodiments can efficiently datum either pressure or both pressure and normal velocity measured in an irregular recording surface to a horizontal reference plane. For single pressure data, in principle, both the Dirichlet boundary condition at the air-water free surface and the flat free surface assumptions are needed. For dual sensor data, the flat sea assumption is not required.

Further embodiments can also reconstruct other seismic frequency bandwidth (different from low frequency), and other seismic data processing applications when either rough sea effect or irregular recording surface effect or both effects need to be considered.

Embodiments in accordance with the invention can be used for multi-data processing applications, such as estimating rough sea elevations, datuming from an irregular recording surface to a horizontal reference plane, reconstructing a low-frequency vertical velocity component under both rough sea and irregular measurement surface conditions, generalized deghosting calculation to take both rough sea and irregular measurement into account, and other relevant data processing. The example embodiments generate the needed new operators in an efficient way by using simplest plane-to-plane constant-velocity extrapolation operators.

Although the example embodiments are illustrated here by using dual-sensor towed streamer data, the principle, method, algorithms and applications involved are suitable for application to other multi-sensor geophysical methods, both onshore and offshore. These methods include, but are not limited to, three- and four-component (3C and 4C) seismic methods, dual-sensor ocean bottom cable (OBC) seismic methods, and any other multi-component seismic method already existing or in the future.

The seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time. A prerequisite for discovery of any oil or gas reservoir is a well-resolved seismic image of the earth's subsurface.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface. The processing and display of acquired seismic data facilitates more accurate decisions on whether and where to drill, and thereby reduces the risk of drilling dry holes.

Embodiments have been discussed as methods for illustrative purposes only, but can also be implemented as a system. Such a system may be implemented by means of computers, in particular digital computers, along with other conventional data processing equipment. Such data processing equipment, well known in the art, may comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In one class of embodiments, the invention may be implemented as methods in accordance with those described above, specifically carried out using a programmable computer to perform the method. In another class of embodiments, the invention may be implemented as a computer readable medium with a computer program stored on the medium, such that the program has logic operable to cause a programmable computer to perform methods in accordance with those described above.

Figure 7:
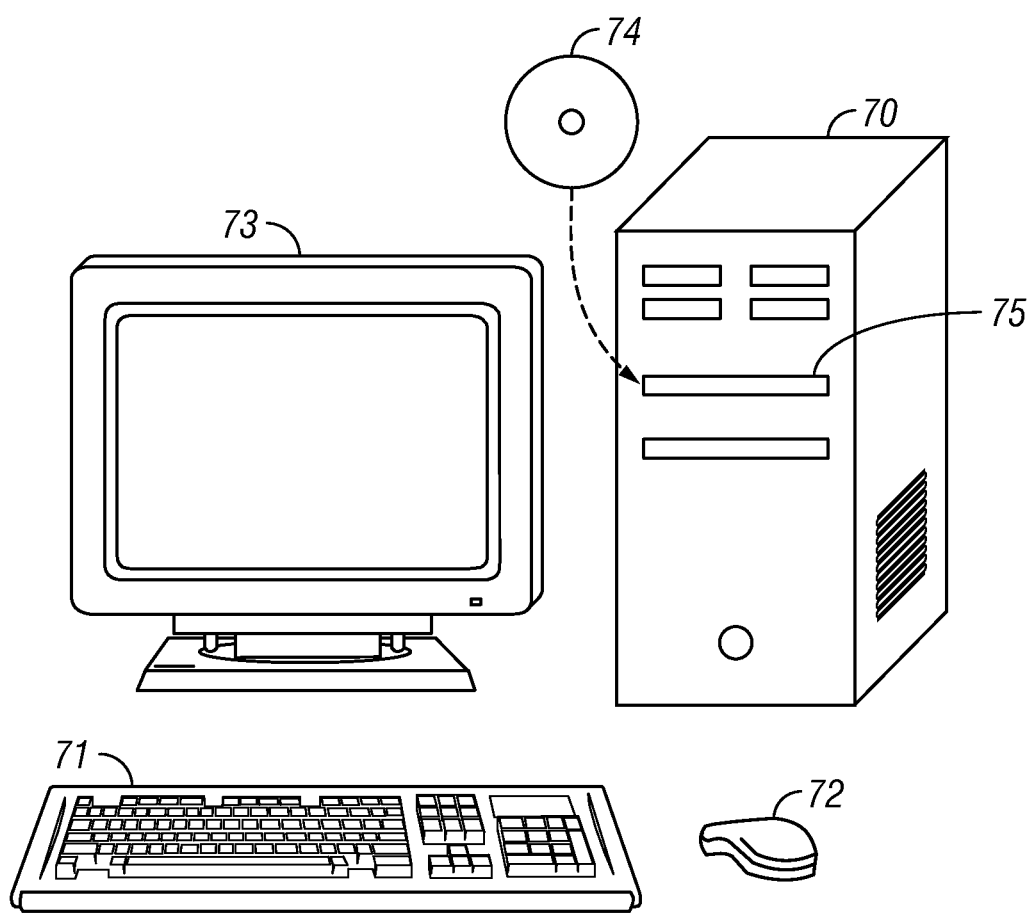
FIG. 7 is a diagram illustrating, by way of example, one of many different types of computer systems that can be used with seismic data processing methods in accordance with embodiments of the invention.

FIG. 7 is a diagram illustrating, by way of example, one of many different types of computer systems that can be used with seismic data processing methods in accordance with embodiments of the invention. A central processor 70 is coupled to user input devices, such as a keyboard 71 (wired or wireless) and a mouse 72 (wired or wireless). The processor 70 is further coupled to a display, such as a monitor 73. A computer program according to the invention may reside on any of a number of computer readable media, such as a disk 74 insertable into a disk drive 75 or on an internal or external hard drive (not shown).

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for reconstructing low-frequency vertical velocity component data under rough sea and irregular recording depth conditions, comprising:
    using a programmable computer to perform the following:
        estimating rough sea elevation from a high-frequency portion of recorded pressure data and recorded vertical velocity component data;
        constructing generalized deghosting and datuming operators, which take into account the estimated rough sea elevation and irregular recording depth conditions;
        decomposing a low-frequency portion of the recorded pressure into up-going and down-going wavefields on a horizontal reference plane, using the generalized datuming and deghosting operators; and
        reconstructing a low-frequency portion of the vertical velocity component data from the decomposed up-going and down-going wavefields on the horizontal reference plane, using the generalized datuming and deghosting operators.

2. The method of claim 1, wherein the estimating rough sea elevation comprises:
    obtaining multi-sensor seismic data from a marine seismic survey;
    selecting a horizontal reference plane between a recording surface and an air-water free surface;
    separating a high-frequency portion of the pressure data into up-going and downgoing pressure wavefields;
    datuming the up-going and downgoing pressure wavefields from the recording surface to the horizontal reference plane;
    determining a sea surface elevation variation range;
    selecting a set of depth levels from the sea surface elevation variation range;
    determining constant velocity plane-to-plane up-going and down-going wavefield extrapolation operators R and R*, respectively, for the set of depth levels;
    extrapolating the up-going and down-going pressure wavefields from the flat reference plane to the set of depth levels using the operators R and R*; and
    estimating a sea surface elevation.

3. The method of claim 2, wherein the extrapolating the up-going and down-going pressure wavefields comprises applying the following equations:

$$U_s(x) = R U_o(x)$$

and $$D_s(x) = R^* D_o(x),$$

where $U_s(x)$ and $D_s(x)$ are the up-going and down-going pressure, respectively, at a horizontal observation plane $z=Z_s$, and $U_0(x)$ and $D_0(x)$ are the up-going and down-going pressure, respectively, at the horizontal reference plane $z=Z_0$.

4. The method of claim 2, wherein the estimating a sea surface elevation comprises applying the following equations:

$$Uz'(x') = -Dz'(x'),$$

where z' is the determined depth z value for a given x', and the minimum of the following noun:

$$X = \Sigma(|Uz(x')| - |Dz(x')|)^2 \text{ for all tested } z \text{ levels,}$$

where the summation is for circular frequency or time for each given x' for all z values in the selected set of depth levels.

5. The method of claim 2, wherein the reconstructing a low-frequency portion of the vertical velocity component data comprises the initial steps of:
  pre-processing recorded pressure data from a single-sensor towed marine seismic streamer;
  constructing a common database of plane-to-plane upward extrapolation operators R and R*, for up-going and down-going wavefields, for the set of depth levels;
  constructing plane-to-curved-surface upward extrapolation operators R' and R'*, for up-going and down-going wavefields, from the common database of extrapolation operators R and R*;
  constructing plane-to-curved-surface downward extrapolation operators R" and R"*, for up-going and down-going wavefields, from the common database of extrapolation operators R and R*;
  determining up-going and down-going pressure wavefields using the extrapolation operators R', R'*, R", and R"*; and
  determining total pressure and total vertical velocity component from the up-going and down-going pressure wavefields.

6. The method of claim 5, wherein the determining up-going and down-going pressure wavefields $U_o(x)$ and $D_o(x)$, respectively, comprises applying the following equations:

$$U_o(x) = R_u P_r(x),$$

and $$D_o(x) = R_d P_r(x),$$

where $$R_u = [I - (R'')^{-1} R''^* (R'^*)^{-1} R''']^{-1} (R'')^{-1},$$

and $$R_d = [I - (R''^*)^{-1} R'' (R'^*)^{-1} R''^*]^{-1} (R''^*)^{-1},$$

where I is unit operator, and $P_r$ is total pressure measured at the irregular recording depth.

7. The method of claim 6, wherein the determining total pressure $P_o(x)$ and total vertical velocity component $V_o(x)$ comprises applying the following equations:

$$P_o(x) = (R_d + R_u) P_r(x) = R_p P_r(x)$$

and $$V_o(x) = \frac{(R_d - R_u) P_r(x)}{F} = \frac{R_v P_r(x)}{F},$$

where $R_p = R_u + R_d$, and $R_v = R_d - R_u$.

8. The method of claim 2, wherein the reconstructing a low-frequency portion of the vertical velocity component data comprises the initial steps of:
  pre-processing recorded pressure data and recorded vertical velocity component data from a multi-sensor towed marine seismic streamer;
  constructing a common database of constant velocity plane-to-plane upward extrapolation operators R and R*, for up-going and down-going wavefields, respectively, for the set of depth levels;
  constructing plane-to-curved-surface upward extrapolation operators R' and R'*, for up-going and down-going wavefields, from the common database of extrapolation operators R and R*;
  constructing plane-to-curved-surface downward extrapolation operators R" and R"*, for up-going and down-going wavefields, from the common database of extrapolation operators R and R*;
  constructing plane-to-curved-surface downward extrapolation operators Q and Q*, for up-going and down-going wavefields, from the common database of extrapolation operators R and R*;
  determining up-going and down-going pressure wavefields using the extrapolation operators R" and R"* and the extrapolation operators Q and Q*; and
  determining total pressure and total vertical velocity component from the up-going and down-going pressure wavefields.

9. The method of claim 8, wherein the determining up-going and down-going pressure wavefields $U_0(x)$ and $D_0(x)$, respectively, comprises applying the following equations:

$$U_o(x) = \tfrac{1}{2}[(R'')^{-1} P_r(x) - (Q)^{-1} P_z(x)]$$

and $$D_o(x) = \tfrac{1}{2}[(R''^*)^{-1} P_r(x) - (Q^*)^{-1} P_z(x)],$$

where $$Q = ik_z R''$$

and $$Q^* = ik_z R''^*,$$

where $P_r$ is total pressure measured at the irregular recording depth, $P_z(x)$ is a normal derivative of pressure, i is the imaginary number, and ic, is vertical wave number.

10. The method of claim 9, wherein the determining total pressure and total vertical velocity component comprises applying the following equations:

$$P_o(x) = \frac{1}{2}\{[(R''^*)^{-1} + (R'')^{-1}] P_r(x) + [(Q^*)^{-1} - (Q)^{-1}] P_z(x)\}$$

and $$V_o(x) = \frac{1}{2} \frac{[(R''^*)^{-1} - (R'')^{-1}] P_r(x) + [(Q^*)^{-1} + (Q)^{-1}] P_z(x)}{F}.$$

11. The method of claim 1, wherein the reconstructing a low-frequency portion of the vertical velocity component data comprises:
  determining plane-to-curved-surface up-going and down-going wavefield extrapolation operators R' and R'*, respectively, which take an irregular sea surface elevation z(x) into account;
  determining plane-to-curved-surface up-going and down-going wavefield extrapolation operators R" and R"*, respectively, which take an irregular recording surface into account;
  determining generalized deghosting and datuming operators $R_u$ and $R_d$ from the extrapolation operators R', R'*, R", and R"*;
  determining a low-frequency portion of up-going and down-going pressure wavefields at the horizontal reference plane; and reconstructing a low-frequency portion of the vertical velocity component from the low-frequency portion of the up-going and down-going pressure wavefields at the horizontal reference plane, taking an irregular sea surface and an irregular recording surface into account.

12. The method of claim 11, wherein the determining extrapolation operators R' and R'* comprises applying the following equations:

$$R'=S(R)$$

and $$R'^*=S(R^*),$$

where S represents a sorting process to establish the new operators R' and R'* from the old operators R and R* for all rows, based on sea level estimate $\Delta z(x)$.

13. The method of claim 11, wherein the determining up-going and down-going pressure wavefields $U_o(x)$ and $D_o(x)$, respectively, comprises applying the following equations:

$$U_o(x)=R_u P_r(x),$$

and $$D_o(x)=R_d P_r(x),$$

where $$R_u=[I-(R'')^{-1}R''^*(R'^*)^{-1}R'J^{-1}(R'')^{-1},$$

and $$R_d=[I-(R''^*)^{-1}R''(R')^{-1}R'^*J^{-1}(R''^*)^{-1},$$

where I is unit operator and $P_r$ is total pressure measured at the irregular recording depth.

14. The method of claim 13, wherein the reconstructing a low-frequency portion of the vertical velocity component comprises applying the following equations:

$$V_u(x) = \frac{-U_o(x)}{F}$$

and $$V_d(x) = \frac{D_o(x)}{F},$$

and $$V_o(x) = V_d(x) + V_u(x) = \frac{D_o(x) + U_o(x)}{F},$$

where $V_u(x)$ and $V_d(x)$ are up-going and down-going waves, respectively, of the low-frequency vertical velocity component at the horizontal reference plane, $V_o(x)$ is the total low-frequency vertical velocity component; and F is:

$$F = \frac{\rho \omega}{k_z}$$

in the frequency-wavenumber domain, a oblique factor for constant velocity water column, where $\rho$ is water density, $\omega$ is circular frequency, and $k_z$ is vertical wave number.

15. At least one non-transitory computer readable medium with a computer program stored thereon, the program having logic operable to cause at least one programmable computer to perform a method comprising:

estimating rough sea elevation from a high-frequency portion of recorded pressure data and recorded vertical velocity component data;
constructing generalized deghosting and datuming operators, which take into account the estimated rough sea elevation and irregular recording depth conditions;
decomposing a low-frequency portion of the recorded pressure into up-going and down-going wavefields on a horizontal reference plane, using the generalized datuming and deghosting operators; and
reconstructing a low-frequency portion of the vertical velocity component data from the decomposed up-going and down-going wavefields on the horizontal reference plane, using the generalized datuming and deghosting operators.

16. The medium of claim 15, wherein the estimating rough sea elevation comprises:
obtaining multi-sensor seismic data from a marine seismic survey;
selecting a horizontal reference plane between a recording surface and an air-water free surface;
separating a high-frequency portion of the pressure data into up-going and downgoing pressure wavefields;
datuming the up-going and downgoing pressure wavefields from the recording surface to the horizontal reference plane;
determining a sea surface elevation variation range;
selecting a set of depth levels from the sea surface elevation variation range;
determining constant velocity plane-to-plane up-going and down-going wavefield extrapolation operators R and R*, respectively, for the set of depth levels;
extrapolating the up-going and down-going pressure wavefields from the flat reference plane to the set of depth levels using the operators R and R*; and
estimating a sea surface elevation.

17. The medium of claim 16, wherein the reconstructing a low-frequency portion of the vertical velocity component data comprises the initial steps of:
pre-processing recorded pressure data from a single-sensor towed marine seismic streamer;
constructing a common database of plane-to-plane upward extrapolation operators R and R*, for up-going and down-going wavefields, for the set of depth levels;
constructing plane-to-curved-surface upward extrapolation operators R' and R'*, for up-going and down-going wavefields, from the common database of extrapolation operators R and R*;
constructing plane-to-curved-surface downward extrapolation operators R" and R"*, for up-going and down-going wavefields, from the common database of extrapolation operators R and R*;
determining up-going and down-going pressure wavefields using the extrapolation operators R', R'*, R", and R"*; and
determining total pressure and total vertical velocity component from the up-going and down-going pressure wavefields.

18. The medium of claim 16, wherein the reconstructing a low-frequency portion of the vertical velocity component data comprises the initial steps of:
pre-processing recorded pressure data and recorded vertical velocity component data from a multi-sensor towed marine seismic streamer;
constructing a common database of constant velocity plane-to-plane upward extrapolation operators R and R*, for up-going and down-going wavefields, respectively, for the set of depth levels;
constructing plane-to-curved-surface upward extrapolation operators R' and R'*, for up-going and down-going wavefields, from the common database of extrapolation operators R and R*;
constructing plane-to-curved-surface downward extrapolation operators R" and R"*, for up-going and down-going wavefields, from the common database of extrapolation operators R and R*;
constructing plane-to-curved-surface downward extrapolation operators Q and Q*, for up-going and down-going wavefields, from the common database of extrapolation operators R and R*;
determining up-going and down-going pressure wavefields using the extrapolation operators R" and R"* and the extrapolation operators Q and Q*; and
determining total pressure and total vertical velocity component from the up-going and down-going pressure wavefields.

19. The medium of claim 15, wherein the reconstructing a low-frequency portion of the vertical velocity component data comprises:
determining plane-to-curved-surface up-going and down-going wavefield extrapolation operators R' and R'*, respectively, which take an irregular sea surface elevation z(x) into account;
determining plane-to-curved-surface up-going and down-going wavefield extrapolation operators R" and R"*, respectively, which take an irregular recording surface into account;
determining generalized deghosting and datuming operators $R_u$ and $R_d$ from the extrapolation operators R', R'*, R", and R"*;
determining a low-frequency portion of up-going and down-going pressure wavefields at the horizontal reference plane; and
reconstructing a low-frequency portion of the vertical velocity component from the low-frequency portion of the up-going and down-going pressure wavefields at the horizontal reference plane, taking an irregular sea surface and an irregular recording surface into account.

20. A method for geophysical prospecting, comprising:
disposing a multi-sensor streamer in a body of water;
responsive to signals recorded at pressure sensors and vertical velocity component sensors in the multi-sensor streamer, calculating pressure traces and vertical velocity component traces, respectively, representing physical reflected wavefields in the body of water incident on the streamer;
reconstructing low-frequency vertical velocity component data under rough sea and irregular recording depth conditions by transforming the pressure and vertical velocity component traces to produce pressure traces representing low-frequency vertical velocity component traces as they would appear if incident on the streamer, the transforming comprising:
estimating rough sea elevation from a high-frequency portion of recorded pressure traces and recorded vertical velocity component traces;
constructing generalized deghosting and datuming operators, which take into account the estimated rough sea elevation and irregular recording depth conditions;
decomposing a low-frequency portion of the pressure traces into up-going and down-going traces on a horizontal reference plane, using the generalized datuming and deghosting operators; and
reconstructing a low-frequency portion of the vertical velocity component traces from the decomposed up-going and down-going traces on the horizontal reference plane, using the generalized datuming and deghosting operators; and
recording the low-frequency vertical velocity component traces.

21. The method of claim 20, wherein the estimating rough sea elevation comprises:
selecting a horizontal reference plane between a recording surface and an air-water free surface;
separating a high-frequency portion of the pressure traces into up-going and downgoing pressure traces;
datuming the up-going and downgoing pressure traces from the recording surface to the horizontal reference plane;
determining a sea surface elevation variation range;
selecting a set of depth levels from the sea surface elevation variation range;
determining constant velocity plane-to-plane up-going and down-going wavefield extrapolation operators R and R*, respectively, for the set of depth levels;
extrapolating the up-going and down-going pressure traces from the flat reference plane to the set of depth levels using the operators R and R*; and
estimating a sea surface elevation.

22. The method of claim 21, wherein the reconstructing a low-frequency portion of the vertical velocity component data comprises the initial steps of:
pre-processing recorded pressure traces from a single-sensor towed marine seismic streamer;
constructing a common database of plane-to-plane upward extrapolation operators R and R*, for up-going and down-going wavefields, for the set of depth levels;
constructing plane-to-curved-surface upward extrapolation operators R' and R'*, for up-going and down-going wavefields, from the common database of extrapolation operators R and R*;
constructing plane-to-curved-surface downward extrapolation operators R" and R"*, for up-going and down-going wavefields, from the common database of extrapolation operators R and R*;
determining up-going and down-going pressure traces using the extrapolation operators R', R'*, R", and R"*; and
determining total pressure and total vertical velocity component traces from the up-going and down-going pressure wavefields.

23. The method of claim 21, wherein the reconstructing a low-frequency portion of the vertical velocity component traces comprises the initial steps of:
pre-processing recorded pressure traces and recorded vertical velocity component traces from a multi-sensor towed marine seismic streamer;
constructing a common database of constant velocity plane-to-plane upward extrapolation operators R and R*, for up-going and down-going wavefields, respectively, for the set of depth levels;
constructing plane-to-curved-surface upward extrapolation operators R' and R'*, for up-going and down-going wavefields, from the common database of extrapolation operators R and R*;
constructing plane-to-curved-surface downward extrapolation operators R" and R"*, for up-going and downgoing wavefields, from the common database of extrapolation operators R and R*;

constructing plane-to-curved-surface downward extrapolation operators Q and Q*, for up-going and down-going wavefields, from the common database of extrapolation operators R and R*;

determining up-going and down-going pressure traces using the extrapolation operators R″ and R″* and the extrapolation operators Q and Q*; and determining total pressure and total vertical velocity component traces from the up-going and down-going pressure traces.

24. The method of claim 20, wherein the reconstructing a low-frequency portion of the vertical velocity component traces comprises:

determining plane-to-curved-surface up-going and down-going wavefield extrapolation operators R' and R'*, respectively, which take an irregular sea surface elevation z(x) into account;

determining plane-to-curved-surface up-going and down-going wavefield extrapolation operators R″ and R″*, respectively, which take an irregular recording surface into account;

determining generalized deghosting and datuming operators $R_u$ and $R_d$ from the extrapolation operators R', R'*, R″, and R″*;

determining a low-frequency portion of up-going and down-going pressure traces at the horizontal reference plane; and reconstructing a low-frequency portion of the vertical velocity component traces from the low-frequency portion of the up-going and down-going pressure traces at the horizontal reference plane, taking an irregular sea surface and an irregular recording surface into account.

* * * * *